United States Patent
Selinfreund et al.

(10) Patent No.: US 7,035,200 B2
(45) Date of Patent: Apr. 25, 2006

(54) OPTICAL DISK COPY-PROTECTION USING AN OPTICALLY CHANGEABLE SECURITY MATERIAL

(75) Inventors: Richard H. Selinfreund, Guilford, CT (US); Peter Miller, New London, CT (US); Rakesh Vig, Durham, CT (US); Junzhong Li, New London, CT (US)

(73) Assignee: Verification Technologies, Inc., Essex, CT (US)

( * ) Notice: Subject to any disclaimer, the term of this patent is extended or adjusted under 35 U.S.C. 154(b) by 98 days.

(21) Appl. No.: 10/359,325

(22) Filed: Feb. 6, 2003

(65) Prior Publication Data
US 2003/0147339 A1    Aug. 7, 2003

Related U.S. Application Data

(60) Provisional application No. 60/355,695, filed on Feb. 7, 2002.

(51) Int. Cl.
*G11B 5/84*    (2006.01)

(52) U.S. Cl. ............... 369/288; 428/64.4; 430/270.1

(58) Field of Classification Search ........... 369/275.4, 369/275.1, 274, 275.2, 280, 287, 288, 84; 430/270.11, 270.1, 269, 320, 321; 428/64.1, 428/64.4; 386/94; 380/201, 203
See application file for complete search history.

(56) References Cited

U.S. PATENT DOCUMENTS

| | | | | | |
|---|---|---|---|---|---|
| 5,398,231 | A | * | 3/1995 | Shin et al. | 369/275.4 |
| 5,608,717 | A | * | 3/1997 | Ito et al. | 369/275.3 |
| 5,675,570 | A | * | 10/1997 | Ohira et al. | 369/275.1 |
| 5,751,690 | A | * | 5/1998 | Ohira et al. | 369/275.3 |
| 5,815,484 | A | | 9/1998 | Smith et al. | |
| 5,946,286 | A | * | 8/1999 | Bahns | 369/275.3 |
| 6,011,772 | A | | 1/2000 | Rollhaus et al. | |
| 6,104,686 | A | | 8/2000 | Whitcher et al. | |
| 6,160,789 | A | * | 12/2000 | Abraham | 369/275.1 |
| 6,480,462 | B1 | * | 11/2002 | Ha et al. | 369/275.4 |
| 6,490,239 | B1 | * | 12/2002 | Nagasaka | 369/275.4 |
| 6,577,588 | B1 | * | 6/2003 | Tachikawa et al. | 369/275.1 |
| 6,842,420 | B1 | * | 1/2005 | Tsukuda et al. | 369/275.4 |

FOREIGN PATENT DOCUMENTS

| | | | | |
|---|---|---|---|---|
| JP | 63-223068 | * | 9/1988 | 369/275.1 |
| JP | 1-228976 | * | 9/1989 | 369/275.1 |

* cited by examiner

*Primary Examiner*—Tan Dinh
(74) *Attorney, Agent, or Firm*—Kelley Drye & Warren LLP

(57) ABSTRACT

A method and system for providing copy-protected optical medium using a substrate having information stored thereon in information pits and information lands, wherein the information lands comprise lands in two different planes.

6 Claims, 1 Drawing Sheet

Compound is only visible where the reflective layer was removed.

OPTICAL DISK COPY-PROTECTION USING AN OPTICALLY CHANGEABLE SECURITY MATERIAL

RELATED PATENT APPLICATIONS

This application claims the benefit of U.S. Provisional Patent Application No. 60/355,695 filed Feb. 7, 2002, which is incorporated by reference herein.

BACKGROUND OF THE INVENTION

1. Field of the Invention

The present invention generally relates to copy-protected optical information recording media and methods for manufacturing the same. More specifically, the present invention relates to the manufacture of an optically readable digital storage medium that protects the information stored thereon from being copied using conventional optical medium readers, such as CD and DVD laser readers, but permits reading of the information from the digital storage media by the same readers.

2. Background of the Invention

Data is stored on optical media by forming optical deformations or marks at discrete locations in one or more layers of the medium. Such deformations or marks effectuate changes in light reflectivity. To read the data on an optical medium, an optical medium player or reader is used. An optical medium player or reader conventionally shines a small spot of laser light, the "readout" spot, through the disc substrate onto the data layer containing such optical deformations or marks as the medium or laser head rotates.

In conventional "read-only" type optical media (e.g., "CD-ROM"), data is generally stored as a series of "pits" embossed in a plane of "lands". Microscopic pits formed in the surface of the plastic medium are arranged in tracks, conventionally spaced radially from the center hub in a spiral track originating at the medium center hub and ending toward the medium's outer rim. The pitted side of the medium is coated with a reflectance layer such as a thin layer of aluminum or gold. A lacquer layer is typically coated thereon as a protective layer.

It is important to note that various nomenclature are used in the art to describe the information-bearing structure formed in read-only type optical media. Often when referenced from the laser-read side, the pits are referred to as "bumps". However, sometimes "lands" from the non-read side are referred to as "pits" from the read-side and "pits" from the non-read side are referred to as "lands" from the read-side. Those skilled in the art would understand from context which structures are being referenced when viewing is described from the read or non-read sides. However, to provide consistency in use, the terms "pits" and "lands" are used throughout this disclosure in conformity with their definitions set forth below.

A readout spot directed from the non-metalized side is reflected in a manner that the light of the readout spot is reflected back into a photo-sensor in the reader. The transitions between pits and lands, and the timing in between such transitions, represent channel bits. Thus, the pits and lands in themselves are not representations of a sequence of zeros or ones.

The intensity of the light reflected from a read-only medium's surface measured by an optical medium player or reader varies according to the presence or absence of pits and lands along the information track. When the readout spot is over a land, more light is reflected directly from the disc than when the readout spot is over a pit. A photo-detector and other electronics inside the optical medium player translate the signal from the transition points between these pits and lands caused by this variation into the 0s and 1s of the digital code representing the stored information.

The vast majority of commercially-available software, video, audio, and entertainment pieces available today are recorded in read-only optical format. One reason for this is that data replication onto read-only optical formats is significantly cheaper than data replication onto writable and rewritable optical formats. Another reason is that read-only formats are less problematical from a reading reliability standpoint. For example, some CD readers/players have trouble reading CD-R media, which has a lower reflectivity and thus requires a higher-powered reading laser or one that is better "tuned" to a specific wavelength.

Interference/reflectivity type optical media comprising a read-only format are typically manufactured following a number of defined steps:

Data to be encoded on the read-only optical medium is first pre-mastered (formatted) such that data can be converted into a series of laser bursts by a laser, which will be directed onto a glass master platter. The glass master platter is conventionally coated with a photoresist such that when the laser beam from the LBR (laser beam recorder) hits the glass master a portion of the photoresist coat is "burnt" or exposed. After being exposed to the laser beam, it is cured and the photoresist in the unexposed area rinsed off. The resulting glass master is electroplated with a metal, typically Ag or Ni. The electroformed stamper medium thus formed has physical features representing the data. When large numbers of optical media of the disc-type are to be manufactured, the electroformed stamper medium is conventionally called a "father disc". The father disc is typically used to make a mirror image "mother disc," which is used to make a plurality of "children discs," which are often referred to as "stampers" in the art. Stampers are used to make production quantities of replica discs, each containing the data and tracking information that was recorded on the glass master. If only a few discs are to be replicated (fewer than 10,000) and time or costs are to be conserved, the original "father" disc might be used as the stamper in the mold rather than creating an entire "stamper family" consisting of a "father", "mother" and "children" stampers.

The stamper is typically used in a mold in conjunction with an injection molding machine to produce replica media. Commercially-available injection molding machines subject the mold to a large amount of pressure by piston-driven presses, in excess of 20,000 pounds.

In the read-only optical medium molding process, a resin is forced in through a sprue channel into a cavity within the optical tooling (mold) to form the optical medium substrate. Today most optical discs are made of optical-grade polycarbonate which is kept dry and clean to protect against reaction with moisture or other contaminants which may introduce birefringence and other problems into the disc, and which is injected into the mold in a molten state at a controlled temperature. The format of the pits and lands is replicated in the substrate by the stamper as the cavity is filled and compressed against the stamper. After the part has sufficiently cooled, the optical tooling mold is opened and the sprue and product eject are brought forward for ejecting the formed optical medium off of the stamper. The ejected substrate is handed out by a robot arm or gravity feed to the next station in the replication line, with transport time and distance between stations giving the substrate a chance to cool and harden.

The next step after molding in the manufacture of a read-only optical medium is to apply a layer of reflective metal to the data-bearing side of the substrate (the side with the pits and lands). This is generally accomplished by a sputtering process, where the plastic medium is placed in a vacuum chamber with a metal target, and electrons are shot at the target, bouncing individual molecules of the metal onto the medium, which attracts and holds them by static electricity. The sputtered medium is then removed from the sputtering chamber and spin-coated with a polymer, typically a UV-curable lacquer, over the metal to protect the metal layer from wear and corrosion. Spin-coating occurs when the dispenser measures out a quantity of the polymer onto the medium in the spin-coating chamber and the medium is spun rapidly to disperse the polymer evenly over its entire surface.

After spin-coating, the lacquer (when lacquer is used as the coat) is cured by exposing it to UV radiation from a lamp, and the media are visually inspected for reflectivity using a photodiode to ensure sufficient metal was deposited on the substrate in a sufficiently thick layer so as to permit every bit of data to be read accurately. Read-only optical media that fail the visual inspection are loaded onto a reject spindle and later discarded. Those that pass are generally taken to another station for labeling or packaging. Some of the "passed" media may be spot-checked with other testing equipment for quality assurance purposes.

Optical media of all types have greatly reduced the costs involved in selling content such as software, video and audio works, and games, due to their small size and the relatively inexpensive amount of resources involved in their production. They have also unfortunately improved the economics of the pirate, and in some media, such as video and audio, have permitted significantly better pirated-copies to be sold to the general public than permitted with other data storage media. Media distributors report the loss of billions of dollars of potential sales due to high quality copies.

Typically, a pirate makes an optical master by extracting logic data from the optical medium, copying it onto a magnetic tape, and setting the tape on a mastering apparatus. Pirates also sometimes use CD or DVD recordable medium duplicator equipment to make copies of a distributed medium, which duplicated copies can be sold directly or used as pre-masters for creating a new glass master for replication. Hundreds of thousands of pirated optical media can be pressed from a single master with no degradation in the quality of the information stored on the optical media. As consumer demand for optical media remains high, and because such medium is easily reproduced at a low cost, counterfeiting has become prevalent.

A variety of copy protection techniques and devices have been proposed in the art to limit the unauthorized copying of optical media. Among these techniques are analog Color-stripe Protection System (CPS), CGMS, Content Scrambling System (CSS) and Digital Copy Protection System (DCPS). Analog CPS (also known as Macrovision) provides a method for protecting videotapes as well as DVDs. The implementation of Analog CPS, however, may require the installation of circuitry in every player used to read the media. Typically, when an optical medium or tape is "Macrovision Protected," the electronic circuit sends a colorburst signal to the composite video and s-video outputs of the player resulting in imperfect copies. Unfortunately, the use of Macrovision may also adversely affect normal playback quality.

There is a need therefore for a copy-protected optical medium, which does not depend entirely on encryption codes or special hardware to prevent the copying of the optical medium. Such optical media should also be easily and economically manufactured given the current strictures of optical medium manufacture. The copy-protected media should also be readable by the large number of existing optical medium readers or players without requiring modifications to those devices.

DEFINITIONS

"Optical Medium" refers to a medium of any geometric shape (not necessarily circular) that is capable of storing digital data that may be read by an optical reader.

"Optical Reader" refers to a Reader (as defined below) for the reading of Optical Medium.

"Reader" refers to any device capable of detecting data that has been recorded on an Optical Medium. By the term "reader" it is meant to include, without limitation, a player. Examples are CD and DVD readers.

"Read-only Optical Medium" refers to an Optical Medium that has digital data stored in a series of pits and lands.

"Pit" refers to a depression in the non-read side of an Optical Medium. The term "pit" is used herein to denote such depression whether reference is made from the read side or the non-read side of the Optical Medium. From the read-side of the Optical Medium a "pit" herein is therefore synonymous with a "bump."

"Land" refers to flat spaces between the Pits in the non-read side of an Optical Medium. The term "land" as used herein is used to denote such flat spaces whether reference is made from the read side or the non-read side of the Optical Medium.

"Recording Layer" refers to a section of an Optical Medium where the data is recorded for reading, playing or uploading to a computer. Such data may include software programs, software data, audio files and video files.

"Re-read" refers to reading a portion of the data recorded on a medium after it has been initially read.

"Optically-Changeable Security Material" refers to an inorganic or organic material used to authenticate, identify or protect an Optical Medium by transiently changing optical state between a first optical state and a second optical state and that may undergo such change in optical state more than one time upon read of the Optical Medium by an Optical Reader in a manner detectable by such Optical Reader.

"Permanent Optically-Changeable Material" refers to an Optically-Changeable Security Material that undergoes a permanent change in optical state when read more than about thirty times upon read of an Optical Medium by an Optical Reader.

"Temporary Optically-Changeable Security Material" refers to an Optically-Changeable Security Material that undergoes a temporary change in optical state when read less than about thirty times upon read of an Optical Medium by an Optical Reader.

The above-defined terms are intended to have their defined meanings herein below whether or not the terms are capitalized.

SUMMARY OF THE INVENTION

The present invention provides an optical medium, a method of manufacture thereof, and a method of authentication with respect thereto, that provides copy protection by including in the optical data structure of optical medium having information pits and information lands, preferably read-only optical medium, the information lands being in either a first plane or a second plane, a reflective layer over the optical data structure comprising information pits and information lands on the side not read by a conventional optical reader, the reflective layer missing over either (or both) the information lands in the first plane or the second plane, and a layer comprising optically changeable security material deposited over the reflective layer so as to cover all information pits and information lands.

In a preferred embodiment there is provided a method for fabricating an optical medium readable by an optical reader, said method comprising the steps of: (a) molding a substrate so as to have a first major surface with information pits and information lands thereon and a second major surface that is relatively planar, the information lands on the first major surface being in either a first plane or a second plane, the second plane more proximal to the second major surface than the first plane; (b) applying a reflective material over the first major surface so as to cover the information pits and information lands; (c) removing the reflective material over said information lands in said first plane; (d) applying a layer over the first major surface comprising an optically-changeable security material; wherein the locations of the first and second planes are pre-selected taking into account the optical reader, and optionally the optically-changeable security material, such that the information lands in the fabricated optical medium may be read by a signal directed by the optical reader through the second major surface whether the optically-changeable security material is in a first optical state or a second optical state and wherein the read by the optical reader is true to the physical structure of the information pits and the information lands when the optically-changeable security material is in at least one of said optical states. It is preferred that the first plane is further from the bottom of the pits than the second plane by a factor of about 2. In one embodiment the first plane is further from the bottom of the pits than the second plane by a factor such that the optical reader records any reflected signal from said optical medium, as adjudged by the transition between tandem information pits and information lands, as differing by ¼ wavelength from the signal directed by the optical reader to the optical medium.

In another preferred embodiment there is provided an optical medium readable by an optical reader comprising: (a) a substrate having a first major surface with information pits and information lands thereon and a second major surface that is relatively planar, the information lands on the first major surface being in either a first plane or a second plane, the second plane more proximal to the second major surface than the first plane; (b) a reflective material layer in contact with the first major surface so as to cover the information pits and the information lands in either the first plane or the second plane; (c) a layer over the reflective material layer comprising an optically-changeable security material. In such embodiment it is preferred that the locations of the first and second planes are such that said information lands may be read by a signal directed by the optical reader through the second major surface whether the optically-changeable security material is in its first optical state or its second optical state and wherein the read by the optical reader is true to the physical structure of the information pits and the information lands when the optically-changeable security material is in at least one of its optical states. In one preferred embodiment of such optical medium the first plane is further from the bottom of the pits than the second plane by a factor of about 2. In another embodiment the first plane is further from the bottom of the pits than the second plane by a factor such that the optical reader records any reflected signal from the optical medium, as adjudged by the transition between tandem information pits and information lands, as differing by ¼ wavelength from the signal directed by said optical reader to said optical medium.

And yet in another embodiment of the present invention, there is a method for authenticating an optical medium having optical data structure representative of a series of bits, said optical data structure comprising information pits and information lands, the information lands being in either a first plane or second plane, the second plane more proximal to the second major surface than the first plane, and further comprising a layer containing an optically-changeable security material, the method comprising the steps of: (a) reading the optical medium at a locus to obtain data true to the series of bits represented by the optical data structure at such locus; (b) re-reading said optical medium at said locus to determine if the data obtained varies by one or more bits in the series of bits represented by the optical data structure at such locus; and (c) authenticating the optical storage medium if the data obtained in step (b) differs from the data obtained in step (a). In one preferred embodiment of such embodiment the authentication method utilizes an optical medium wherein the first plane is further from the bottom of the pits than the second plane by a factor of about 2. In another case, the authentication method may employ such optical medium having the first plane further from the bottom of the pits than said second plane by a factor such that the optical reader records any reflected signal from the optical medium, as adjudged by the transition between tandem information pits and information lands, as differing by ¼ wavelength from the signal directed by said optical reader to said optical medium.

BRIEF DESCRIPTION OF THE DRAWINGS

The accompanying drawings, which are incorporated in and a constitute part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
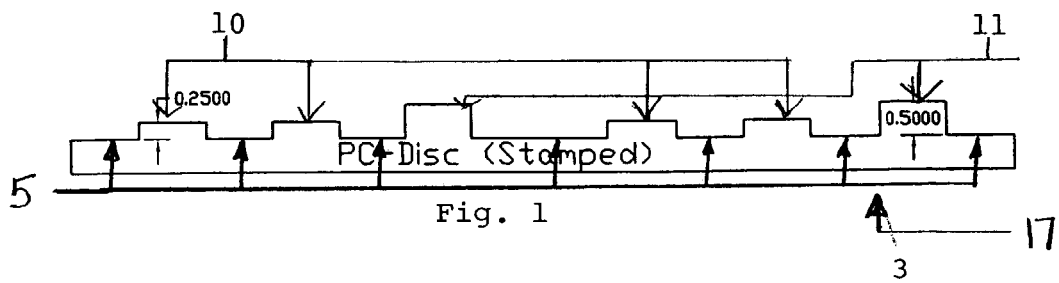
FIG. 1 illustrates a stamped polycarbonate disc having two types of lands that differ from each other in depth by a factor of two.

The present invention effectuates a temporary change at the bit level of an optical medium that may be measured by an optical reader, the temporary change being induced by a signal of the optical reader when the optical disc is read by the optical reader on the "read-side." The temporary change at one or more loci (preferably more than one locus is altered in a manner to produce the temporary change) is used to authenticate an optical medium (a validly-produced optical medium producing such temporary change at such loci).

In a particularly preferred embodiment, an optically-changeable security material is used to effectuate a change at the same resolution as the pits and lands that represent digital content on the disc. The optically-changeable security material may include, without limitation, a material that in response to a signal from the optical reader changes optical state so as to become more or less reflective, to cause a change in refractive index, to emit electromagnetic radiation, to cause a change in color of the material, to emit light such as by (but not limited to) fluorescence or chemiluminescence, or change the angle of any emitted wave from the optically-changeable security material in comparison to the angle of the incident signal from the optical reader. As most conventional optical readers use laser-incident light to read the optical medium, it is preferred that the optically-changeable security material be responsive to one or more of the conventional laser wavelengths used in such conventional optical readers.

In a further particularly preferred embodiment, a substrate having pits of nearly identical depth (so as to be read by the optical reader the same) and having lands in two different planes, that is, lands in a first plane and lands in a different second plane, is employed. It is particularly preferred that the lands in both planes may be readable by an optical reader reading from the read-side of the totally-fabricated optical medium. The optical medium may comprise any of the materials well-known to those skilled in the art, though more preferably a high-grade polycarbonate, such as produced and commercially-sold by GE Plastics.

In a further particularly preferred embodiment, the optically-changeable security material is readable by the reader only with respect to lands in one of the planes (but not both). Such selective land read of the optically-changeable security material can be performed by etching or otherwise removing, the reflective layer that conventionally sits over the information pits and the information lands on the non-read side of the optical medium, such that the optically-changeable security material is readable by the optical reader where the reflective layer has been removed.

It has been found that it is particularly useful if the information lands in the first plane are further from the bottom of the pits than the information lands in the second plane by a factor of two. The lands in the first plane will appear as bumps on the non-read side of the optical medium (conventionally the label side). Such lands should allow the reflective layer associated with the lands to be removed without damaging the adjacent areas. In a particularly commercially-useful embodiment, the optically-changeable security material is applied in a layer, such as a polymer layer, along the entire non-read side of the optical medium with only the areas where the reflective layer was removed allowing the compound to interact with a drive.

In a particularly preferred embodiment, the information lands in the second plane are the conventional distance from the bottom of the pits of a read-only optical medium of 0.2500 nanometers (nm), and the information lands of the first plane are 0.5000 nm from the bottom of the pits. Any difference in distance between the two planes should allow an optical reader to at one time read each land as an information land, and at another time read the information lands at a greater distance from the pits as other than an information land, most preferably as a pit.

In one preferred embodiment a polycarbonate substrate with lands in a first plane and lands in a second plane are manufactured. The non-read side of the substrate is then metallized and the metal removed only from the lands in the first plane, as by, for example, an etching process. At the resolution of the lands, there is a huge jump between a land in the first plane and a land in the second plane. Mastering of the lands in the first plane may be performed, for example by the commercially available processes of Calimetrics (who has performed multi-level mastering to produce 8 discrete levels.)

In a conventional read-only optical medium, the optical reader reads the information pits as dark and the information lands as bright. With respect to the information lands in the first plane in such embodiment it is a goal to allow such a conventional reader to read these lands once as bright and then as dark. It is noted that a key to a good reflected signal is the difference in depth between an information pit and an information land. Given the present disclosure, one of ordinary skill in the art would be capable of choosing the proper distances between the information pits and the information lands for a given optical medium.

The optical change in the optically-changeable security material must be detected by the optical read in the pickup with enough intensity to fool the optics, most preferably, into seeing a pit instead of a land. If a transient phase change in reflectivity is produced by the optically-changeable security material, then the reflectivity change would have to be operative. In one phase, the material should be highly reflective and the information lands in the first plane would be bright due to the specular (vs. diffuse) reflectivity of the material. In the other phase, the information lands in the first plane would be dark due to the diffuse (vs. specular) reflection from the phase change material. Of course, the response of the "transient lands" (those of depth type having the optically-changeable security material readable by the optical reader) would have to be reverse engineered through EFM demodulation, CIRC decoding, and Block decoding. Given the present disclosure, it is asserted that such would be in the purview of one of ordinary skill in the art.

Operation of the optical medium may be controlled by an authentication algorithm on the optical medium or on a component associated with the optical reader, or the optical reader itself. The two optical states permit the design of a more robust authentication algorithm than in the past.

Now turning to the figures, there is shown in FIG. 1 a preferred stamped polycarbonate disc of the present invention having information lands (10) in a plane that is a distance from the bottom of pits (5) of 0.2500 nm, and information lands (11) in a plane that is a distance from the bottom of the pits (5) of 0.5000 nm.

Figure 2:
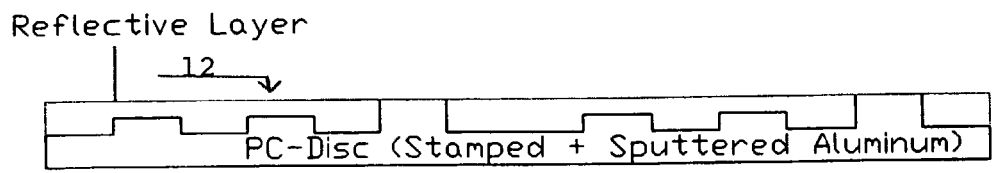
FIG. 2 illustrates the stamped disc of FIG. 1 wherein a reflective layer covers the information pits and information lands along the data side (or non-read side) of the disc.

FIG. 2 illustrates the stamped disc of FIG. 1 wherein a reflective layer (12) covers the information pits and the information lands along the non-read side of the disc. As would be understood by one of ordinary skill, the reflective layer need not cover, as shown, information lands (11) to the same extent as information lands (10) for operation of the of the method.

Figure 3:
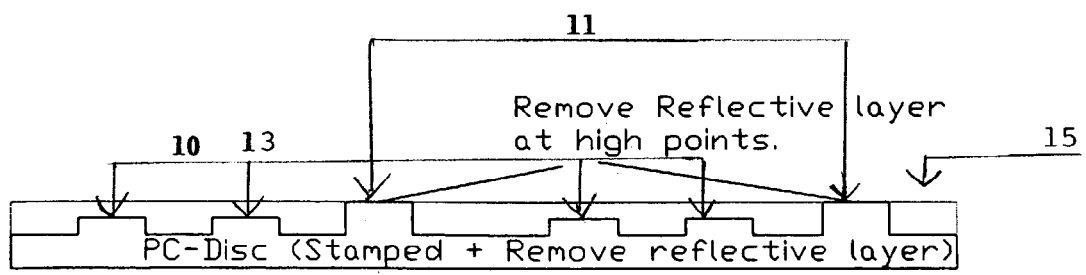
FIG. 3 illustrates a method for causing information lands in a first plane and a second plane to have no, or minimal (not effecting read by an optical reader), reflective material above.

FIG. 3 illustrates a method for causing information lands (11) to have no, or minimal (not effecting read by an optical reader), reflective material above them by removing the reflective layer at the high points along the non-read side (15) of the medium.

Figure 4:
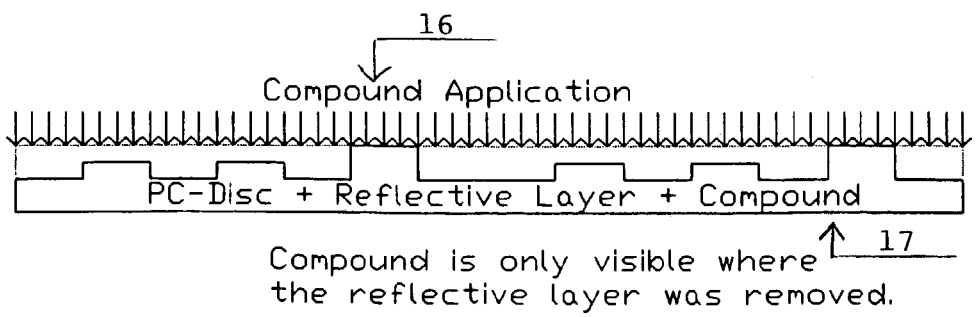
FIG. 4 illustrates the optical disc produced by the method of FIG. 3 wherein a layer comprising an optically-changeable security material is applied above each information pit and information land but only observable by a reader where the reflective layer has been removed.

FIG. 4 illustrates the optical disc produced by the method of FIG. 3, wherein a layer comprising an optically-changeable security material (16) is applied above each information pit and information land, the optically-changeable security material being readable from the read-side (17) of the optical medium where the reflective layer was removed.

While the invention has been described with respect to preferred embodiments, those skilled in the art will readily appreciate that various changes and/or modifications can be made to the invention without departing from the spirit or scope of the invention as defined by the appended claims. All documents cited herein are incorporated by reference in their entirety.

What is claimed is:

1. A method for fabricating an optical medium readable by an optical reader, said method comprising the steps of:
   molding a substrate so as to have a first major surface with information pits and information lands thereon and a second major surface that is relatively planar, said information lands on said first major surface being in either a first plane or a second plane, said first plane being further from the bottom of said pits than said second plane by a factor of about 2;
   applying a reflective material over the first major surface so as to cover said information pits and information lands;
   removing the reflective material over said information lands in said first plane;
   applying a layer over said first major surface comprising an optically changeable security material;
   wherein the locations of the first and second planes are pre-selected taking into account said optical reader and said optically changeable security material,
   wherein said information lands in said fabricated optical medium may be read by a signal directed by said optical reader through said second major surface so as to ascertain whether the optically changeable security material is in a first optical state or a second optical state,
   and wherein the read by said optical reader is true to the physical structure of said information pits and said information lands when the optically changeable security material is in at least one of said optical states.

2. The method of claim 1 wherein said first plane is further from the bottom of said pits than said second plane by a factor such that the optical reader records any reflected signal from said optical medium, as adjudged by the transition between tandem information pits and information lands, as differing by ¼ wavelength from the signal directed by said optical reader to said optical medium.

3. An optical medium readable by an optical reader comprising:
   a substrate having a first major surface with information pits and information lands thereon and a second major surface that is relatively planar, said information lands on said first major surface being in either a first plane or a second plane; said first plane is further from the bottom of said pits than said second plane by a factor of about 2 and said second plane more proximal to said second major surface than said first plane;
   a reflective material layer in contact with said first major surface so as to cover said information pits and said information lands in either said first plane or said second plane;
   a layer over said first major surface comprising an optically changeable security material where said reflective material layer has been removed;
   wherein the locations of the first and second planes are such that said information lands may be read by a signal directed by said optical reader through said second major surface so as to ascertain whether the optically changeable security material is in its first optical state or its second optical state, and wherein the read by said optical reader is true to the physical structure of said information pits and said information lands when the optically changeable security material is in at least one of said optical states.

4. The optical medium of claim 3 wherein said first plane is further from the bottom of said pits than said second plane by a factor such that the optical reader records any reflected signal from said optical medium, as adjudged by the transition between tandem information pits and information lands, as differing by ¼ wavelength from the signal directed by said optical reader to said optical medium.

5. The method of claim 1 wherein said layer is applied over said second major surface, comprising optically changeable security material.

6. The optical medium of claim 3 wherein said layer covers said second major surface, comprising optically changeable security material.

* * * * *